United States Patent Office 3,530,270
Patented Sept. 22, 1970

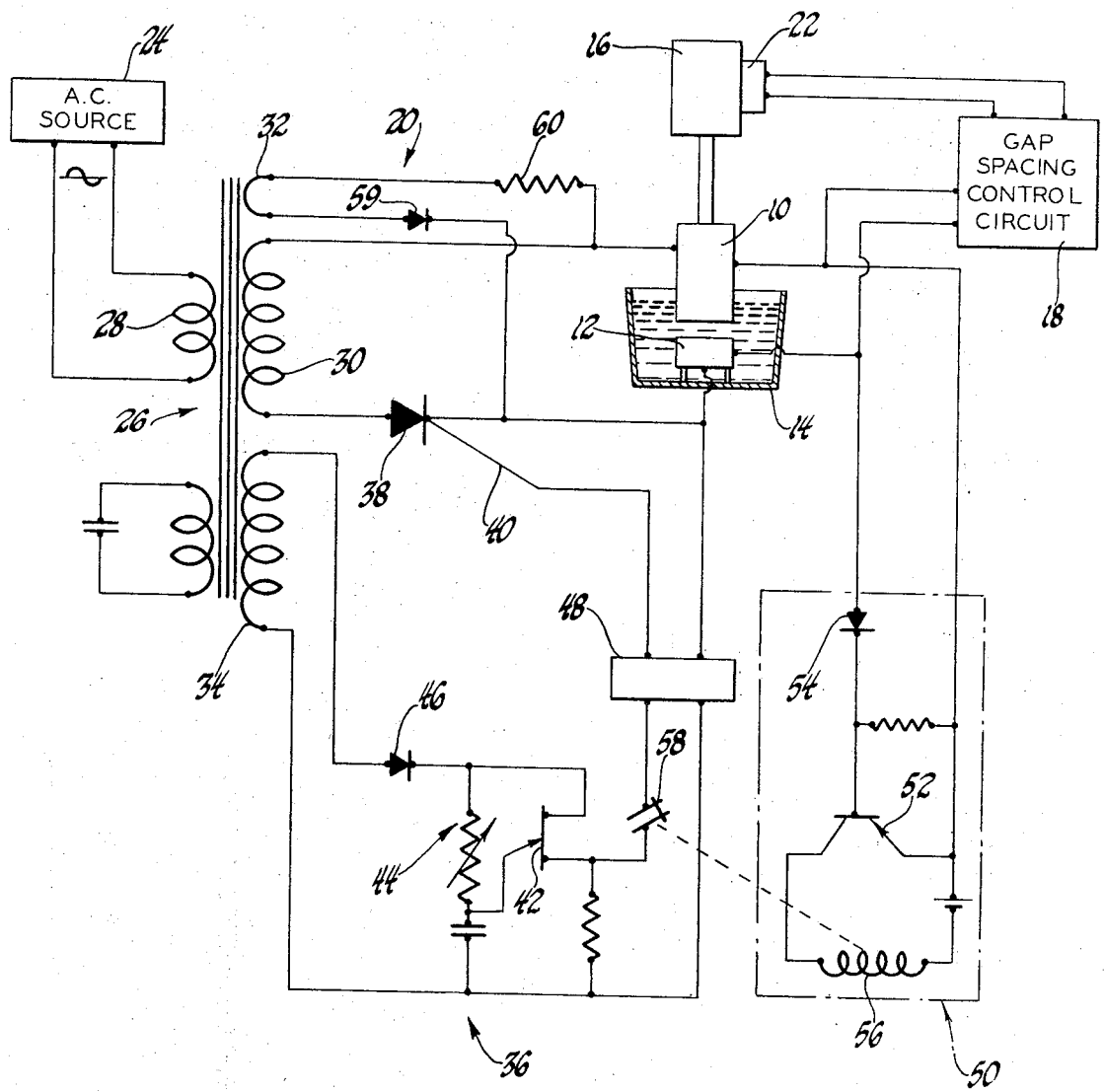

3,530,270
ELECTRICAL DISCHARGE MACHINING
APPARATUS
John J. Ross, Warren, Mich., assignor to General Motors
Corporation, Detroit, Mich., a corporation of Delaware
Filed Aug. 30, 1966, Ser. No. 576,019
Int. Cl. B23p 1/08
U.S. Cl. 219—69    9 Claims

ABSTRACT OF THE DISCLOSURE

An electrical discharge machining apparatus power supply incorporating a controlled rectifier both for rectification and switching purposes. A triggering device operates the controlled rectifier, which converts power from an AC source to unidirectional pulses of a certain time-phase relation to the AC power and in synchronism with its frequency. A voltage detector senses short circuit conditions and causes the triggering device to turn off the controlled rectifier until the condition is cleared, after which a reset voltage is applied across the gap and the voltage detector then, in response to this reset voltage, reactivates the triggering device so as to recommence operating the controlled rectifier.

---

This invention relates to improvements in electrical discharge machining apparatus and particularly to the power supplies therefor.

The electrical discharge machining process can be used for many diverse applications provided the various parameters of the electrical discharges are properly controlled; e.g., their frequency, amplitude and duration. Exemplary is the simultaneous machining of cutting die sets comprising the male and female dies. The male dies are made of a relatively hard material, such as carbide or a quality steel, and perform as the cutting tool electrode; while the female dies are also made of a hard material, such as a quality steel, and perform as the workpiece electrode. As can be appreciated, the discharges must be very carefully controlled so that both the proper finish and the necessary precision are obtained. It has been found that controlled rectifiers facilitate such control but do not alone solve the short circuit problem, which is more pronounced, since the occurrence of short circuiting conditions which promote continuous current flows usually at isolated points with the gap, if permitted even for a short interval, can cause irreparable damage from the resultant burning to either or both of these expensive dies. It is, therefore, necessary to stop operation of the controlled rectifier promptly upon the occurrence of a short circuit. Subsequently and as quickly as the short circuit condition subsides, the process must be recommenced, preferably automatically, so as to avoid lengthy down or nonmachining times.

With the foregoing in mind a new and different provision is made for sensing an undesired gap condition, such as that producing a short circuit, and immediately upon occurrence causing the power to the gap to be turned off. This is achieved in a preferred embodiment by maintaining the power supply's controlled rectifier nonconductive. Also by the proposal, a certain minimum voltage is imposed across the gap for reset purposes. When the short circuit condition is cleared, this minimum voltage becomes effective to permit the controlled rectifier to be again rendered conductive.

In the preferred embodiment of the invention a power supply incorporating a controlled rectifier for both switching and rectification purposes is employed to produce electrical stock removing discharges across the gap. The controlled rectifier has the control electrode thereof connected in circuit with a triggering device that is operated in synchronism with the frequency of the power supply's AC source. A gap condition responsive device senses gap voltage, and if this gap voltage is at some low value characteristic of, e.g., a short circuit, the gap condition responsive device will disconnect the triggering device from the control electrode so that the controlled rectifier cannot be operated and, accordingly, the power supply. To reinitiate operation of the power supply after the short circuit condition is removed, the gap voltage is increased by a reset feature to some predetermined level to which the gap condition responsive device responds and the control electrode is reconnected to the triggering device so that operation again is reinitiated.

The foregoing and other objects and advantages of the invention will become apparent from the following description and the accompanying drawing in which the single figure shows schematically apparatus for carrying out the principles of the invention.

Referring now to the drawing in detail, the numerals 10 and 12 denote electrodes, which hereinafter will be referred to respectively as the cutting tool and the workpiece. The workpiece 12 is mounted within a tank 14 to which a suitable dielectric fluid is supplied from a source, not shown. The cutting tool 10 in this embodiment is maneuvered relative to the workpiece 12 to maintain some selected machining gap by a motor, designated generally at 16. Of course, the workpiece 12 could be the electrode that is maneuvered or both the cutting tool 10 and the workpiece 12 can be maneuvered. The motor 16 is controlled by gap spacing control circuit 18 in accordance with variations in gap voltage. While the selected gap spacing is being maintained by the motor 16, cutting power is supplied to the gap by a power supply, shown generally at 20. Electrical discharges then occur across the dielectric fluid-filled gap in a way well known and cause stock to be eroded from the workpiece 12 according to a pattern determined by the configuration of the cutting tool 10.

Preferably the motor 16 is fluid pressure operated by a force motor 22. The gap spacing control circuit 18 senses the voltage across the gap between the cutting tool 10 and the workpiece 12 and compares this gap voltage with a reference voltage that corresponds to the desired gap spacing. Any difference resulting from this comparison, which is an algebraic summation, is the error signal to which the force motor 22 responds. Thus, if the gap voltage decreases, the summation will result in an error signal that through the force motor 22 will cause the motor 16 to slow, stop or retract the cutting tool 10 so as to increase the gap spacing and correspondingly the gap voltage. The gap spacing control circuit 18, the force motor 22 and the motor 16 may be of any known kind, such as disclosed in the patents to Colten et al. 3,059,150 and Ferguson 3,213,257. These patents also describe the details of the structure.

The power supply 20 includes an AC source 24 which furnishes power to the gap at a certain frequency, e.g., 10 kc. The AC source 24 can, by way of example, be an oscillator or a motor-generator set. For coupling the AC source 24 across the gap a transformer, denoted generally at 26, is preferably employed. This transformer 26 includes a primary winding 28 that is connected to the source 24, a main secondary winding 30 connected across the gap, a reset secondary winding 32 also connected across the gap, and a triggering secondary winding 34 for a triggering device, denoted generally at 36. The functions of the reset and triggering windings 32 and 34 will be subsequently explained. The main secondary winding 30 has in series therewith a switching device, such as a controlled rectifier 38, which may be a commercially available silicon controlled rectifier of the avalanche type. This rectifier 38, in addition to a switch function, half-wave rectifies the power so that, e.g., only half-cycles of a selected polarity from the AC source 24 are applied across the gap. This selected polarity can be either positive or negative, determined by materials and results expected, as is well understood by those versed in the art. The somewhat conventional polarity would require that the cutting tool 10 be negative and the workpiece 12 positive.

To provide accurate time phase control of the gap discharges relative to the power from the AC source 24 the controlled rectifier 38 has its control electrode 40 supplied with trigger pulses by the triggering device 36 in a certain synchronous relation to the phase of the power from the AC source 24. This triggering device preferably employs a unijunction transistor 42 having its input, which is the emitter circuit, connected through an RC network 44 and a rectifier 46 to the triggering secondary winding 34. The output from the unijunction transistor 42 is from the base circuit and is delivered to a wave shaping circuit 48.

Operationally, the triggering secondary winding 34 is excited by the AC source 24 and develops a sine wave shaped pulse that is half-wave rectified by the rectifier 46. The RC network 44 is adjusted so that the unijunction transistor 42 is turned on at some selected point during the excursion of the pulse from the source 24. A trigger pulse is then generated having a corresponding time duration and this pulse is shaped by the shaping circuit 48, if required, before being applied to the control electrode 40 of the controlled rectifier 38. The shaping network 48 can provide isolation and additionally give the shaping, if needed, to provide a sharp turn-on of the controlled rectifier 38. The anode potential is such that the controlled rectifier 38 will conduct so as to connect the main winding 30 to the gap. This will then produce a gap discharge. As can be appreciated, this discharge can occur, determined by the triggering device 36, any time during the selected half-cycle of operation of the AC source 24. For example, if the duration of the selected half-cycle of the sine wave shaped pulse from the AC source 24 is 50 microseconds, the pulse applied to the gap can occur for the last half of the half-cycle and have, e.g., a duration of 25 microseconds. Of course, it can be longer or shorter or occur during the beginning of the half-cycle if desired. For a more detailed explanation of the power supply 20 and its operation, reference can be made to copending application Ser. No. 579,660, filed Sept. 15, 1966, and entitled "Electrical Discharge Machining Apparatus," to August F. Scarpelli, Millard A. Ferguson and John J. Ross.

With the foregoing ability to control the parameters of the discharge so precisely, the EDM apparatus is capable of machining cutting die sets with cutting tool 10 becoming the male die and the workpiece 12 the female die. Since quality materials are required, such as carbide or steel for the cutting tool 10 and steel for the workpiece 12, there is necessarily concern for the condition of the gap. For example, any short circuit producing condition must be dissipated quickly instead of allowing dissipation due to the normal maneuvering of the cutting tool 10 during readjustment for gap spacing purposes. Otherwise, irreparable damage can occur to these expensive die sets. For this reason a gap condition responsive device, such as the voltage detector denoted generally at 50, is employed. This voltage detector 50 may be in different forms but preferably employs a bistable device, such as a switching transistor 52, having its emitter-base circuit connected across the gap. The emitter-base circuit performs as the input and has in series therewith a rectifier 54, which insures that unidirectional voltage pulses are supplied to the transistor 52. The emitter-collector circuit in serving as the output has a relay winding 56 therein which controls relay contacts 58 in the output from the unijunction transistor 42. The switching transistor 52 is so biased that when a short circuit condition exists and the voltage across the gap decreases to a certain value the switching transistor 52 will become conductive and the relay winding 56 energized. This opens the relay contacts 58 so that no trigger pulses are supplied to the control electrode 40 for the controlled rectifier 38. Hence, when the controlled rectifier 38 is turned off by the reduction of the current therethrough below the holding current level, conduction cannot reoccur and power from the main secondary winding 30 is no longer applied to the gap until the short circuit condition dissipates.

The clearing of the short circuit condition is instantly known because the reset winding 32 previously mentioned becomes effective. This reset winding 32 includes a rectifier 59 and a current limiting resistor 60 which limits current flow to the gap to a minimum. As soon as the short circuit condition clears, keeping in mind that a short circuit causes the voltage across the gap to decrease to zero or a very low value, a reset voltage is applied by the reset winding 32 to the gap. This reset voltage will, of course, be determined by the number of turns of the winding 32 and the value of the resistor 60, but will be below that which would produce a gap ionization but above that characteristic of a short circuit condition. This reset voltage, when sensed by the voltage detector 50, will be adequate with the bias established for the switching transistor 52 to turn it off. This deenergizes the relay winding 56 and closes the relay contacts 58 so that the triggering device 36 again becomes effective to provide trigger pulses to the controlled rectifier's control electrode 40 and recommence operation of the power supply.

Briefly summarizing the operation of the power supply 20 as well as the entire apparatus, the cutting tool 10 and the workpiece 12 will initially be moved proximate each other and then the AC source 24 turned on. The main secondary winding 30 and the triggering winding 34 are both energized by sine wave shaped pulses but the controlled rectifier 38 is off so that no energy is applied to the gap. The sine wave shaped pulses are rectified in the triggering device 36 by the rectifier 46 and when of a certain level determined by the RC network 44 will turn on the unijunction transistor 42. An output trigger pulse will be developed at the output of the transistor 42. This trigger pulse will be shaped in the shaping network 48 and cause the controlled rectifier 38 to be turned on for some selected part of the half-cycle of the input sine wave pulse. A discharge then will occur across the gap, which will be interrupted when the pulse from the main secondary winding, e.g., goes to zero, so that the anode potential of the controlled rectifier 38 is at a level that will cause the controlled rectifier 38 to be turned off. If, for exemplary purposes, the controlled rectifier 38 is fired during the last half of the positive excursion of the pulse from the AC source 24, it will turn off approximately at the zero point and then, of course, during the negative half-cycle the controlled rectifier 38 will remain off.

From the foregoing it will be appreciated that a power supply employing a controlled rectifier for accurate control of the parameters of the pulses applied to the gap is provided with the gap voltage detector 50 that provides quick, spontaneous cutoff of the power by interrupting the supply of triggering pulses to the controlled rectifier as soon as a short circuit condition is sensed. There is no need for the operator to stop the machine and, subsequently, start it because the reset winding 32 will raise the gap voltage to a level that will turn off the voltage detector 50 automatically after the short circuit condition is eliminated, which should normally occur as soon as the power to the gap is turned off. Therefore, turn-off and turn-on occur automatically.

The invention is to be limited only by the following claims.

What is claimed is:

1. In electrical discharge machining apparatus; the combination of cutting tool and workpiece electrodes arranged for relative movement so as to form a certain machining gap therebetween; means supplying electrical power to the gap for machining the workpiece, the power supply including an AC source, and circuit means operative to couple the AC source across the gap so as to produce electrical machining discharges thereacross, the circuit means including a controlled rectifier operative in the conductive and nonconductive states thereof to respectively connect and disconnect the AC source to and from the gap, triggering means operated by the AC source for supplying trigger pulses to the controlled rectifier for rendering the controlled rectifier conductive so that the electrical machining discharges occur at a frequency related to the frequency of the source and also in a certain time-phase relation therewith, and gap condition responsive means for disconnecting the controlled rectifier from the triggering means so as to maintain the controlled rectifier nonconductive when one gap condition exists, the gap condition means including a switching device operative in response to the one gap condition to assume one state thereof and disconnect the triggering means from the controlled rectifier and in response to another gap condition of the gap to assume the other state thereof and reconnect the triggering means to the controlled rectifier, and reset means for providing the other condition of the gap so that the switching device assumes the other state thereof.

2. The electrical discharge machining apparatus described in claim 1 wherein the one condition is a certain minimum gap voltage characterizing a short circuit condition in the gap and wherein the switching device assumes the one state thereof when the gap voltage is at the certain minimum.

3. The electrical discharge machining apparatus described in claim 2 wherein the other condition is a predetermined gap voltage between the certain minimum and the gap breakdown voltage and wherein the reset means provides the predetermined reset gap voltage.

4. The electrical discharge machining apparatus as described in claim 1 wherein the switching device is a switching transistor that in the conductive state thereof disconnects the triggering means from the controlled rectifier and in the nonconductive state connects the triggering means to the controlled rectifier.

5. The electrical discharge machining apparatus described in claim 3 wherein the switching device is a switching transistor that in response to the certain minimum gap voltage assumes the conductive state thereof and disconnects the triggering means from the controlled rectifier and that in response to the predetermined gap voltage assumes the nonconductive state thereof and reconnects the triggering means to the controlled rectifier, and wherein the controlled rectifier includes a control electrode and the triggering means applies trigger pulses at a frequency that is related to the frequency of the AC source to the control electrode for rendering the controlled rectifier conductive.

6. In electrical discharge machining apparatus, the combination of relatively movable cutting tool and workpiece electrodes spaced apart so as to form a certain machining gap therebetween, means supplying power to the gap for machining the workpiece, the supply means including a power source, means connecting when operative the source across the gap so as to produce electrical machining discharges across the gap, gap condition responsive means for rendering the connecting means inoperative, the gap condition responsive means including a semiconductor switch biased so as to respond to a certain gap voltage and assume one state in which the connecting means is rendered inoperative and so as to respond to another certain gap voltage and assume another state in which the connecting means is rendered operative, and reset means for providing a predetermined reset gap voltage for returning the switch to the other state thereof.

7. The electrical discharge machining apparatus described in claim 6 wherein the one condition is a certain minimum gap voltage and the other condition is a predetermined gap voltage between the certain minimum voltage and the gap breakdown voltage and wherein the semiconductor switch is a switching transistor that in response to the certain minimum voltage is rendered conductive and that in response to the predetermined voltage is rendered nonconductive.

8. The electrical discharge machining apparatus described in claim 6 wherein the reset means is energized by the source and is arranged to provide the predetermined gap voltage for causing the switch to assume the other state thereof.

9. In electrical discharge machining apparatus, the combination of conductive cutting tool and workpiece electrodes maneuverable relative to each other so as to form a predetermined machining gap therebetween, means supplying electrical power to the gap for machining the workpiece, the power supply means including an AC source and a transformer having a primary winding connected to the AC source, machining and reset secondary windings each connectable across the gap, a controlled rectifier arranged in series with the machining secondary winding and operative in the conductive state thereof to connect the secondary winding across the gap, the controlled rectifier having a control electrode, trigger means operated by the AC source for applying trigger pulses to the control electrode so as to render the controlled rectifier conductive and cause electrical machining discharges across the gap at a frequency related to the frequency of the AC source, gap voltage responsive means for disconnecting the control eelctrode from the triggering means when the gap voltage is at a certain minimum characterizing a short circuit condition within the gap, the gap voltage responsive means including a switching device operative in response to the certain voltage to disconnect the control electrode from the triggering means, the switching device being operative after the short circuit condition is removed in response to the voltage applied across the gap by the reset secondary winding to reconnect the control electrode to the triggering means.

References Cited

UNITED STATES PATENTS

| | | |
|---|---|---|
| 2,981,822 | 4/1961 | Larkins. |
| 3,020,448 | 2/1962 | Fefer. |
| 3,129,357 | 4/1964 | Ullman et al. |
| 2,769,078 | 10/1956 | Matulaitis. |
| 3,217,207 | 11/1965 | Webb. |
| 3,243,567 | 3/1966 | Lobur. |

RALPH F. STAUBLY, Primary Examiner